United States Patent
Smith

(10) Patent No.: US 6,531,685 B2
(45) Date of Patent: Mar. 11, 2003

(54) SEPARATE EXCITER WINDINGS FOR WELD AND AUXILIARY POWER

(75) Inventor: Alan F. Smith, Fremont, WI (US)

(73) Assignee: Illinois Tool Works Inc., Glenview, IL (US)

( * ) Notice: Subject to any disclaimer, the term of this patent is extended or adjusted under 35 U.S.C. 154(b) by 0 days.

(21) Appl. No.: 09/820,056

(22) Filed: Mar. 28, 2001

(65) Prior Publication Data

US 2002/0139787 A1 Oct. 3, 2002

(51) Int. Cl.⁷ .................................................. B23K 9/10
(52) U.S. Cl. ......................................... 219/133; 322/63
(58) Field of Search ................................ 219/133, 134; 322/63, 64, 65, 66

(56) References Cited

U.S. PATENT DOCUMENTS

| | | | |
|---|---|---|---|
| 3,649,903 A | * | 3/1972 | Fiedler ........................ 219/133 |
| 4,314,195 A | | 2/1982 | Muter |
| 5,734,147 A | | 3/1998 | Bunker et al. |
| 5,764,036 A | * | 6/1998 | Vaidya et al. .................. 322/63 |
| 5,968,385 A | | 10/1999 | Beeson et al. |

OTHER PUBLICATIONS

Miller® The Power of Blue. Trailblazer® Pro 350 Owner's Manual Nov. 2000.
Miller® Bobcat™ 225G plus (Kohler–Powered) Jan. 1997 Owner's Manual.
Miller® Bobcat™ 225D (60Hz), 200D (50Hz) Technical Manual Service And Parts. Nov. 1995.
Miller® Bobcat™ 225G plus Technical Manual Sep. 1997.

* cited by examiner

Primary Examiner—Clifford C. Shaw
(74) Attorney, Agent, or Firm—George R. Corrigan

(57) ABSTRACT

A method and apparatus for providing power from an engine includes a one or more output windings in of slots on a generator. A plurality of exciter windings are in magnetic communication with the one or more output windings. The exciter windings are also placed in slots in the generator. The location of slots for the various windings is chosen to produce a desired output. A power supply is in electrical communication with the one or more output windings. Preferably, there are as many or more exciter windings as there are output windings.

41 Claims, 5 Drawing Sheets

SEPARATE EXCITER WINDINGS FOR WELD AND AUXILIARY POWER

FIELD OF THE INVENTION

The present invention relates generally to the art of engine driven welding power supply systems. More specifically, it relates to engine-driven welding power supply systems with a welding power output and an auxiliary power output.

BACKGROUND OF THE INVENTION

Engine driven welding power supply systems may be driven either by a DC generator or an AC generator (also called an alternator-rectifier). An AC generator generally includes, in addition to an alternator, a reactor followed by rectifiers to provide a DC output. One prior art engine-driven welding power supply system is the Miller Bobcat 225® welding power supply. (Engine-driven welding power supply system, as used herein, includes one or more of the engine, the generator, and the power supply. Welding power supply, as used herein, includes power supplies that provide welding, plasma or heating power, and may include a controller, switches, etc.).

The Miller Bobcat 225® welding power supply includes a generator having a single primary mover, with a single exciter, stator and rotor to provide a welding power output and an auxiliary power output. The auxiliary power is 60 Hz power, 120/240 volts used to operate lights, tools, and other 60 Hz. loads. The auxiliary power is ideally a sinusoidal, constant voltage source (like utility power).

The welding output is derived from a single phase welding output winding, and the auxiliary power is derived from a single phase auxiliary output winding that are part of the generator stator. (Output winding, as used herein, includes a winding connected to be able to provide power to a load.) These windings are electrically isolated from each other, but are in magnetic communication (magnetic communication, as used herein, includes windings wherein a single revolving magnetic field is provided to both windings, and/or the windings are wound about a common stator). The magnetic field is created by passing a dc field current through the winding on the rotor. The dc field current is derived from a single excitation winding in the generator stator—the welding power and the auxiliary power share an excitation winding. (Excitation or exciter winding, as used herein, includes a winding connected to provide current to a field winding).

When there is a current output the load current flows in the stator windings and creates a magnetic field called the armature reaction field. The armature reaction field increases with load current. The combination of the magnetic field from the field winding and the armature reaction field is the net magnetic field that produces welding and auxiliary output power.

The armature reaction field opposes the field produced by the field windings on the rotor and reduces the net magnetic field in the generator, which reduces the output voltage of the generator. The reduction in net magnetic field and output voltage increases as the load current increases, because the armature reaction field increases with load current. Such a voltage reduction is particularly undesirable for auxiliary power, which is ideally a constant voltage source (to mimic utility power).

Prior art engine driven welding power supply systems attempt to compensate for the armature reaction field by increasing the field current. However, the resistance of the field winding (rotor coil) requires that, to increase field current, the voltage applied to the field windings must be increased. The field current is increased by increasing the voltage supplied to the field windings. The increased field voltage is provided by increasing the voltage supplied by the excitation winding on the stator.

One prior art technique to increase the field current is described in U.S. Pat. No. 5,734,147, issued Mar. 31, 1998, entitled Method And Apparatus For Electronically Controlling The Output Of A Generator Driven Welding Power Supply, Bunker et al., incorporated herein by reference. Electronic control and feedback is used to adjust the field current to the desired magnitude. This is an effective way to control the field current, but it requires a relatively sophisticated and costly electronic control scheme.

Another prior art engine driven welding power supply systems, the Miller Bobcat 225®, uses a simple system with no electronics or printed circuit boards. The excitation winding in the stator is connected to a diode bridge to rectify the current to dc, a capacitor for smoothing, and a variable resistor, for controlling the magnitude of the field current. A variable resistor may be included to compensate for temperature drift. Generally, the system provides for an increased exciter voltage (which increases field current) by using the influence of the load current flowing in other windings on the stator. Specifically, single phase load currents cause a harmonic interaction in other windings in the stator.

Prior to explaining how these components compensate for the armature reaction field, a brief discussion of the harmonic interaction is useful. A single phase load current flowing in a stator winding causes a pulsating magnetic field. The pulsating magnetic field can be resolved into two components, one that rotates in the forward direction, with the rotor, and one that rotates in the opposite direction. Stated another way, when the load is unbalanced the magnetic field wave created by the stator currents does not move at the speed as the rotor and may be resolved into two components: a forward component that is in the same direction and at the same speed as the rotor, and a backward component. The forward component behaves as a balanced three phase load. The backward component moves at the same speed as the rotor, but in the opposite direction. Thus, it has a motion relative to the rotor of twice the generator speed. This "moving" magnetic field induces voltage in the excitation winding, which causes a higher output voltage. This phenomena is described in Engine Driven Invertor With Feedback Control, Beeson et al, issued Oct. 19, 1999 as U.S. Pat. No. 5,968,385, which is incorporated herein by reference.

The "backward" component of the magnetic field induces ac current at twice the fundamental frequency in the rotor winding (because the relative speed of the backward component is twice the rotor speed). The second harmonic component of field current in the rotor causes harmonic voltages to be induced in the stator windings. The primary harmonic in the stator windings is the third harmonic (the second harmonic of the field current plus the speed of the rotor).

The relative phasing of the third harmonic and the fundamental influence the shape of the resulting voltage waveform, such as being flat-topped, or reduced shoulders with an increased peak voltage. A high peak voltage provides maximum boosting under load. The Miller Bobcat 225® engine driven welding power supply system captures the high peak voltage with the capacitor connected to the excitation windings, smooths the voltage and applies it to the field winding, which in turn drives more field current, and boosts the output.

The desired relative phasing between the fundamental and the harmonics is effected by the placement of the excitation windings and the output windings—i.e. in which slots the windings are placed. Because there are separate welding output and auxiliary output windings, the relative placement of the excitation and load windings, and the relative phasing of the harmonics, will be different for the welding output and the load output. Thus, the placement of the single exciter winding must be based on desirable welding output, a desirable, auxiliary output, or a compromise therebetween.

The Miller Bobcat 225® engine driven welding power supply system has the exciter winding placed to provide a greater output boost for the welding output windings (to provide a desirable welding output). Unfortunately, providing the additional power for welding results in little output boost for an auxiliary load.

This provides a desirable welding output, but at the expense of auxiliary power. Specifically, the generator folds back as the auxiliary output is loaded, which results in low auxiliary power output in proportion to the size of the generator. The problem is exacerbated when the system is used to start an electric motor.

Accordingly, an engine-driven welding power supply system that provides an output boost for both welding output and auxiliary output is desirable. Preferably, such a system will be relatively simple and not complex or costly.

SUMMARY OF THE PRESENT INVENTION

According to a first aspect of the invention an engine-driven welding power supply system includes welding and auxiliary output windings, and a welding and auxiliary exciter windings in magnetic communication with the output windings. A welding power supply is connected to output windings, and the power supply provides a welding output and an auxiliary output.

The welding output winding and the auxiliary output winding are in magnetic communication in one embodiment, and are wound about a common stator in another embodiment. The welding exciter winding and the auxiliary exciter winding are wound about the common stator in yet another embodiment.

A field winding receive field current from the welding exciter winding and from the auxiliary exciter winding in another alternative embodiment. A rectifier is disposed between the welding exciter winding and the field winding, and another rectifier is disposed between the auxiliary exciter winding and the field winding in other embodiments. A controller is connected to the welding power supply and the field winding in yet another embodiment. The generator is preferably an ac generator.

The placement of the various windings, the auxiliary output is such that the welding output and the auxiliary output are optimized in an alternative embodiment.

A second aspect of the invention is a method of providing welding and auxiliary power that includes turning a primary mover, inducing current in a welding output winding, inducing current in a welding exciter winding in magnetic communication with the welding output winding, inducing current in an auxiliary output winding, and inducing current in an auxiliary exciter winding in magnetic communication with the auxiliary output winding. The output of the welding output winding is provided to a welding power output and the output of the auxiliary output winding is provided an auxiliary output.

Inducing a current in the welding output or exciter windings induces a current in the auxiliary output or exciter winding in various alternatives. The welding output windings and the auxiliary output windings are wound about a common stator associated with a rotor, and turning the primary mover turn the rotor in another embodiment.

The location of the welding output winding, the auxiliary output winding, the welding exciter winding and the auxiliary exciter winding are determined by determining the placement that optimizes the welding output and the auxiliary output in another embodiment.

Current from the welding exciter winding and from the auxiliary exciter winding are rectified-and/or provided to a field winding in various embodiments.

AC power is generated in another embodiment.

Another aspect of the invention is engine-driven power supply system includes an output winding, a first exciter winding, and a second exciter winding, in magnetic communication with one another. A power supply is connected to the output winding. An alternative includes a second output winding.

Another aspect of the invention is an engine-driven welding power supply system having a generator, including a stator with a plurality of slots. A welding output winding is wound in a first subset of the plurality of slots to provide a magnetic axis in a first direction. A welding exciter is wound in a second subset of the plurality of slots to provide a magnetic axis in a second direction. An auxiliary output winding is wound in a third subset of the plurality of slots to provide a magnetic axis in a third direction. An auxiliary exciter winding is wound in a fourth subset of the plurality of slots to provide a magnetic axis is in a fourth direction. A welding power supply is in electrical communication with the welding output winding and the auxiliary output winding. The welding power supply has a welding output and an auxiliary output.

The angle between the first direction and the second direction is such that a desired welding output is produced, and/or the angle between the third direction and the fourth direction is such that a desired auxiliary output is produced in various alternatives.

The angle between the first direction and the second direction is such that a welding exciter winding voltage increases as the welding output winding is loaded, and/or the angle between the third direction and the fourth direction is such that an auxiliary exciter winding voltage increases as the auxiliary output winding is loaded in other alternatives.

The angle between the third direction and the fourth direction is empirically determined and/or calculated in alternative embodiments.

Another aspect of the invention is a method of designing an engine-driven welding power supply system. The system has a generator with a stator with a plurality of slots, a welding output winding, a welding exciter winding, an auxiliary output winding, and an auxiliary exciter winding. The method includes winding the various windings in a various subsets of the slots such that each winding has a magnetic axis. The magnetic axis of the welding output winding is in a first direction, the welding exciter winding magnetic axis is in a second direction, the auxiliary output winding magnetic axis is in a third direction, and auxiliary exciter winding magnetic axis in a fourth direction. A welding power supply is connected to the welding output winding and the auxiliary output winding, and the welding power supply provides a welding output and an auxiliary output.

The angle between the auxiliary output and exciter winding magnetic axes is empirically determined and/or calculated in various alternatives.

Yet another aspect of the invention is an engine-driven power supply system including a plurality of output windings in a first plurality of slots and a plurality of exciter windings in a second plurality of slots. The exciter windings are in magnetic communication with the output windings. The location of the first and second plurality of slots is such that a desired output is produced. A power supply is connected to the output windings.

According to one alternative, there are as many or more exciter windings as there are output windings.

Other principal features and advantages of the invention will become apparent to those skilled in the art upon review of the following drawings, the detailed description and the appended claims.

Figure 1:
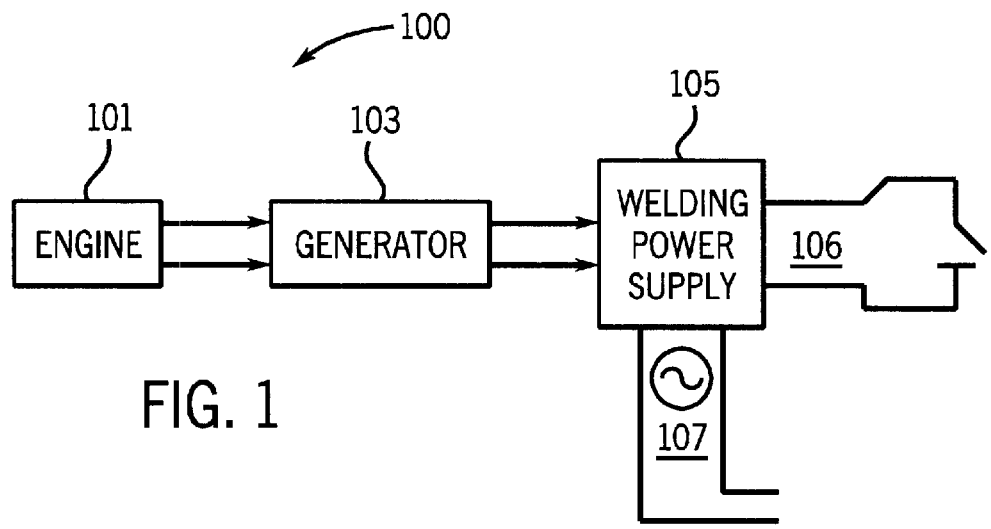
FIG. 1 is a block diagram of a welding system constructed in accordance with the preferred embodiment.

Before explaining at least one embodiment of the invention in detail it is to be understood that the invention is not limited in its application to the details of construction and the arrangement of the components set forth in the following description or illustrated in the drawings. The invention is capable of other embodiments or of being practiced or carried out in various ways. Also, it is to be understood that the phraseology and terminology employed herein is for the purpose of description and should not be regarded as limiting. Like reference numerals are used to indicate like components.

DETAILED DESCRIPTION OF THE PREFERRED EMBODIMENTS

While the present invention will be illustrated with reference to a particular engine-driven welding power supply system and particular components, electronics, windings etc., it should be understood at the outset that the invention may also be implemented with other systems and components, that provide welding and auxiliary power, or that provide other types of power. Generally, the invention is most applicable when at least two types of output power is provided.

A welding system 100 in accordance with the preferred embodiment including an engine or primary mover 101, a generator 103 and a welding power supply 105, is shown in FIG. 1. Welding system 100 provides a welding output 106 and an auxiliary output 107. The preferred embodiment is generally implemented using a welding system such as the Miller Bobcat 225®. The engine, generator and welding power supply can be part of a single package, or can be in discreet modules or cases. Additionally, welding power supply 105 includes a controller which can be in a discreet module or case.

Generally, engine 100 rotates a rotor in generator 103. Generator 103 is in electrical communication with welding power supply 105, or has an electrical output provided as an input to welding power supply 105. (Electrical communication with, as used herein, includes a connection wherein electrical signals and/or power may be provided or received.) Welding power supply 105 provides welding output 106, which is typically low voltage and high current (20–40 V and 100–225 amps), and auxiliary output 107 which is 60 Hz, 120/240 V, with sufficient current to power hand tools, lights etc.

Unlike prior art systems generator 103 includes two exciter windings on the stator. The placement (or slot location) of exciter windings relative to load windings in a single-phase generator can affect the field current that is supplied to the field. One exciter winding is placed such that the phase between the fundamental and harmonics result in an exciter voltage shape having reduced shoulders with an increased peak voltage when there is a welding output. The high peak voltage is captured by a capacitor and provides maximum boosting under load, which is a desirable welding output. The other exciter winding is placed such that the phase between the fundamental and harmonics result in an exciter voltage shape having reduced shoulders with an increased peak voltage for the auxiliary output. The high peak voltage is captured by the capacitor and provides maximum boosting for the auxiliary output, which is a desirable auxiliary output. The two exciter winding outputs are combined with diodes, so that the greater exciter output is provided to the field winding. Generally, the exciter windings voltages increase as the output windings are loaded. This in turn will drive more field current, which maintains the output voltage constant.

Figure 2:
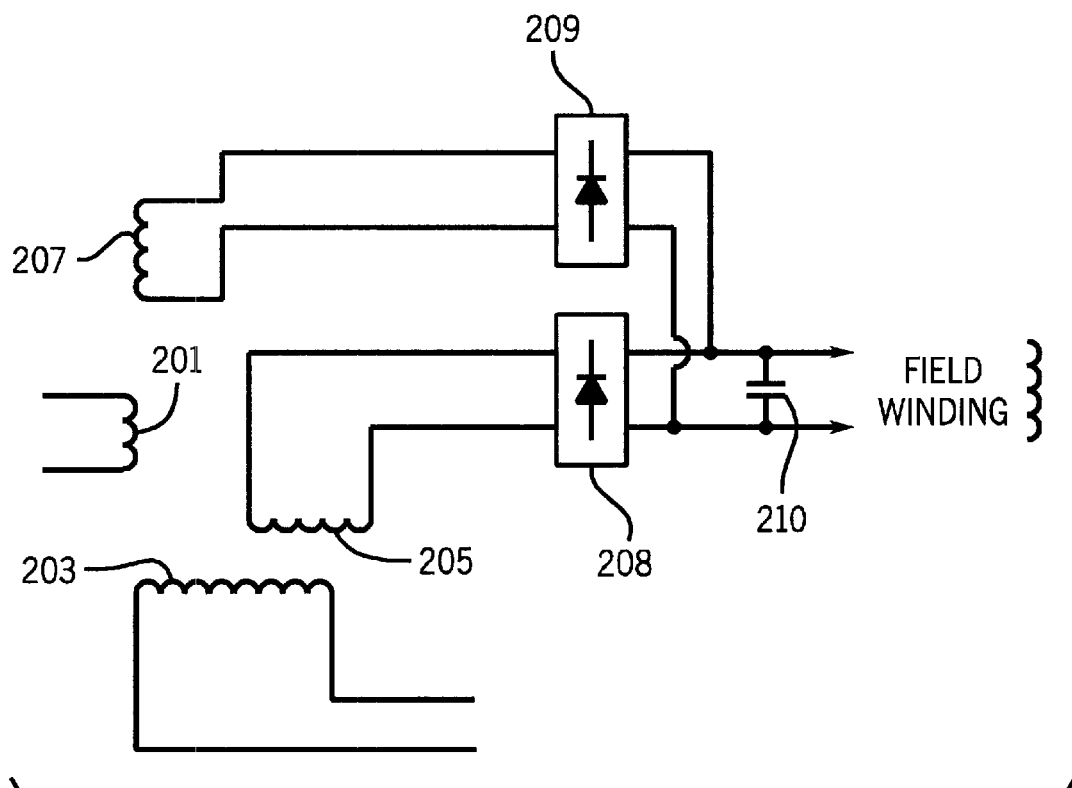
FIG. 2 is schematic diagram of a generator constructed in accordance with the present invention.
Figure 3:
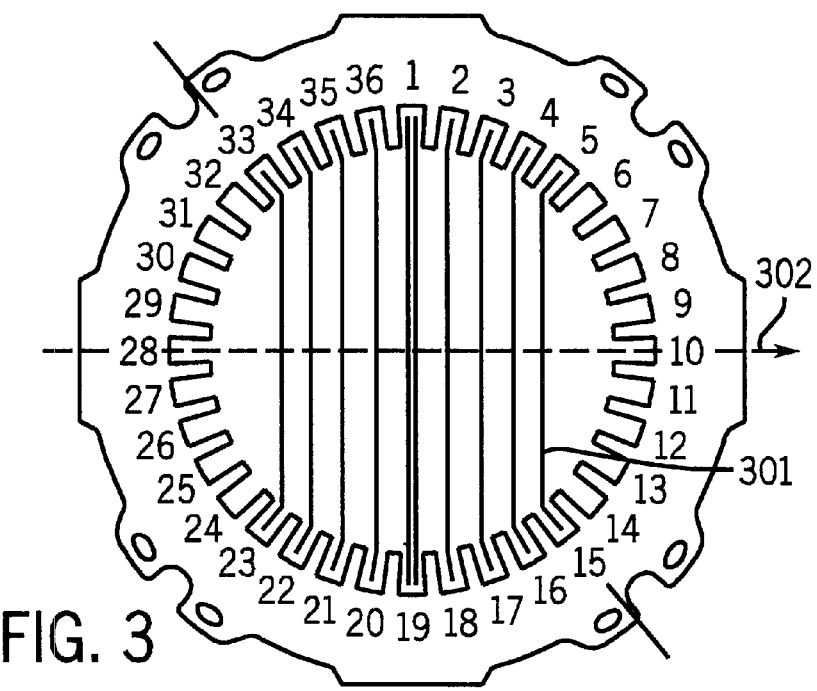
FIG. 3 is a schematic showing the slot location of a welding output winding in accordance with the preferred embodiment.
Figure 4:
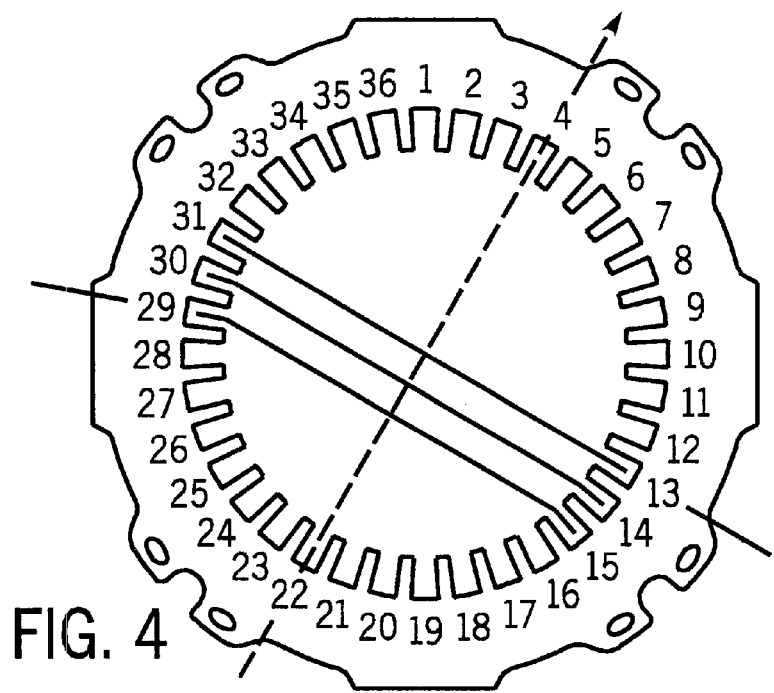
FIG. 4 is a schematic showing the slot location of a welding exciter winding in accordance with the preferred embodiment.
Figure 5:
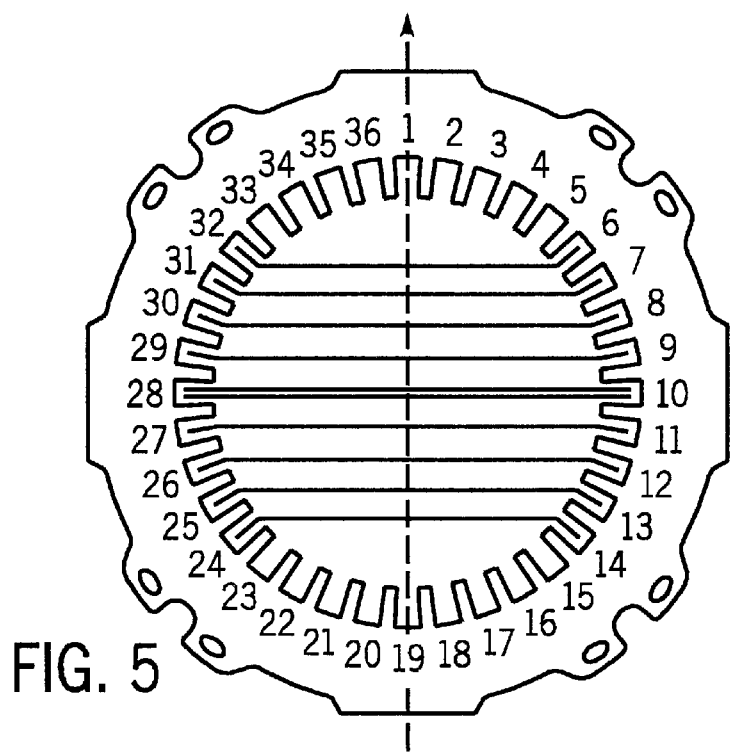
FIG. 5 is a schematic showing the slot location of an auxiliary exciter winding in accordance with the preferred embodiment.
Figure 6:
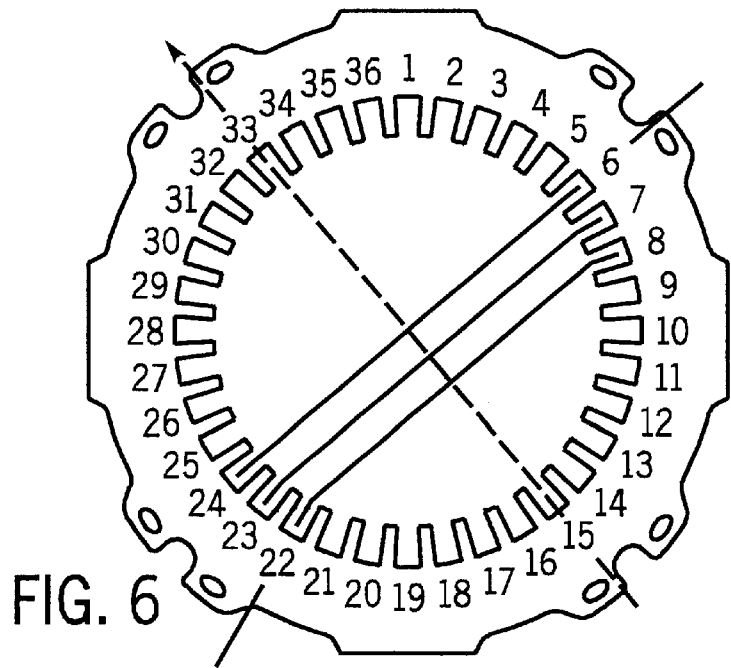
FIG. 6 is a schematic showing the slot location of an auxiliary excitation winding in accordance with the preferred embodiment.

More specifically, as shown in FIG. 2, generator 103 includes a welding output winding 201, an auxiliary output winding 203, a welding excitation winding 205, an auxiliary excitation winding 207, rectifiers 208 and 209, and a capacitor 210. The output of welding winding 201 is provided to welding power supply 105 (FIG. 1). The output of auxiliary winding 203 is also provided to welding power 105, which provides it as the AC auxiliary output. The auxiliary and welding outputs are preferably electrically isolated from one another. The AC auxiliary output is located directly on the generator in some embodiments. Welding excitation winding 205 provides current through rectifier 208 to the field winding. As stated above, welding excitation winding 205 is placed on the stator to provide a desirable boost to the field current when there is a welding output (which causes a desirable boost in the welding output). Windings 201, 203, 205 and rectifier 208 are similar to the prior art.

Auxiliary winding 207 provides its output through rectifier 209 to the field winding. Because the excitation winding outputs are provided through rectifiers 208 and 209, their outputs are effectively "ORED"—the greater voltage from the two excitation windings is applied to the field winding. Rectifiers 208 and 209 are full bridge rectifiers in the preferred embodiment, but may be half-bridges or combined rectifiers in alternative embodiments. Capacitor 210 smooths the outputs of rectifiers 208 and 209 and captures the high peak voltages. Capacitor 210 should have sufficient capacitance to provide the amount of smoothing desired. As stated above, auxiliary excitation winding 207 is placed on the stator to provide a desirable boost to the field current when there is an auxiliary output (which causes a desirable boost in the auxiliary output).

One alternative embodiment includes a single output winding and two excitation windings. This embodiment may be useful when the single output winding is used for two or more applications having different desired V-A curves, or a single application with a V-A curve with multiple breakpoints. Another embodiment includes more output windings than excitation windings. Yet another embodiment includes more excitation windings than output windings. Generally, the invention includes multiple excitation windings, where each excitation winding provides an output boost at a desired phase and/or desired output range. An exciter winding voltage increases as the output windings are loaded to drive more field current, thus maintaining a constant output voltage. Alternatively, the exciter windings could be placed to provide a drooping or other characteristic output. Generally, the slot location are chosen to optimize the output. (Optimize the output, as used herein, refers to obtaining an output having desired charateristics, given design constraints such as cost, weight etc.).

The slot location of the various windings will determine the shape of the output curve. Specifically, the slot location determines the relative phase of the fundamental and the third harmonic, which determines the relationship of the boost to the unboosted output. The slot location is thus chosen, in the preferred embodiment, to provide a desired output shape. The preferred slot location is determined empirically, by calculation, and a combination thereof in various embodiments.

The calculation is based on the power factor of the load, number of turns of the output winding, number of turns of the field winding, and resistance of the field. The welding output circuit has a reactor with different taps for different output current ranges. The taps cause the power factor of the load to be different for different ranges. The different power factor for the different ranges means that each range position theoretically has a different exciter placement. The placement for a single exciter that provided the best boosting effect over all the weld ranges was empirically determined. Alternatively, exciters for different ranges could be provided.

FIGS. 3–6 show slot locations for the welding output, welding excitation, auxiliary output, and auxiliary excitation windings, respectively. The magnetic axis is shown as 302, 402, 502 and 602, respectively. These slot locations for the preferred embodiment, are well suited for a Miller Bobcat®-type machine (with the added excitation winding). The slots chosen for the welding output are 33-5 and 23-15, which provide the magnetic axis 302 at slots 10-28 (referenced as 0 degrees). The slots for the welding excitation winding, determined empirically and by calculation, are 29-31 and 15-13, which provide a magnetic axis from slot 22-4 (60 degrees). The slots for the auxiliary output winding, were chosen to be slots 23-32 and 14-6, which provide a magnetic axis from slot 19-1 (90 degrees). The slots for the auxiliary excitation winding, determined empirically and by calculation, are 22-24 and 8-6, which provide a magnetic axis from slot 15-33 (130 degrees). Thus, the phase difference of the welding output and excitation windings is 60 degrees, while the phase difference of the auxiliary output and excitation windings is 40 degrees. These relative phases produce a desired boost for the welding output, and a desired boost for the auxiliary output.

The empirical determination of the desired slot may be made by placing windings in various slots, and monitoring the output. Alternatively, the following model and calculations may be used to determine the correct placement of exciter windings in a single phase self excited generator.

The single-phase generator of the preferred embodiment is used as the model. A brief review of that generator is useful before beginning the calculations. It has two single phase output windings in the same stator; one winding is for welding output, the other for auxiliary output. The field excitation is derived from the exciter windings through diode bridges, rheostat, and brushes to the rotating field. The voltage output from the exciter windings are influenced by the load in the weld or auxiliary output windings. The ideal is to have the exciter winding voltage increase as the output windings are loaded. This drives more field current to maintain the output voltage constant. The voltage boost is due to the asymmetric nature of single-phase loads. Some of the voltage boost is an increase in the fundamental frequency voltage, and some is due to harmonic interactions. Ideally, the greatest increase in fundamental voltage occurs when the peak of the harmonic voltages is in phase with the peak of the fundamental. This provides the greatest increase in peak voltage from the exciter, which in turn will be captured by the capacitor in the system, and maintain a CV output.

The model is based on the standard d-q machine model, with a resistive load, (1.0 pf) such as the auxiliary output winding would have applied to it. It is assumed that only fundamental frequency voltages and currents flow in the auxiliary output winding. The single phase load current induces second harmonic currents in the field winding, the second harmonic currents in the field winding induce third harmonic voltages in all the stator windings, not just the exciter winding. Third harmonic voltages in the output winding applied to a resistive load give rise to third harmonic load currents. Third harmonic load currents induce fourth harmonic currents in the field winding. Fourth harmonic field currents induce fifth harmonic voltages in the stator winding, etc.

The ideal model is an infinite series of harmonics—even harmonics in the field winding and odd harmonics in the stator winding. While the ideal model could be used and might be appropriate in some circumstances, for the preferred embodiment using only the dominant third harmonic (and ignoring greater harmonics) does not introduce significant error and is sufficient. The effects of current flowing in the exciter windings are also ignored, as this current is not large and will not have a great effect. One potential error is due to the effects of magnetic saturation which may be different in the d and q axis. The model is applied to the loaded output winding first, and these results are used to complete the analysis for another stator winding.

Figure 7:
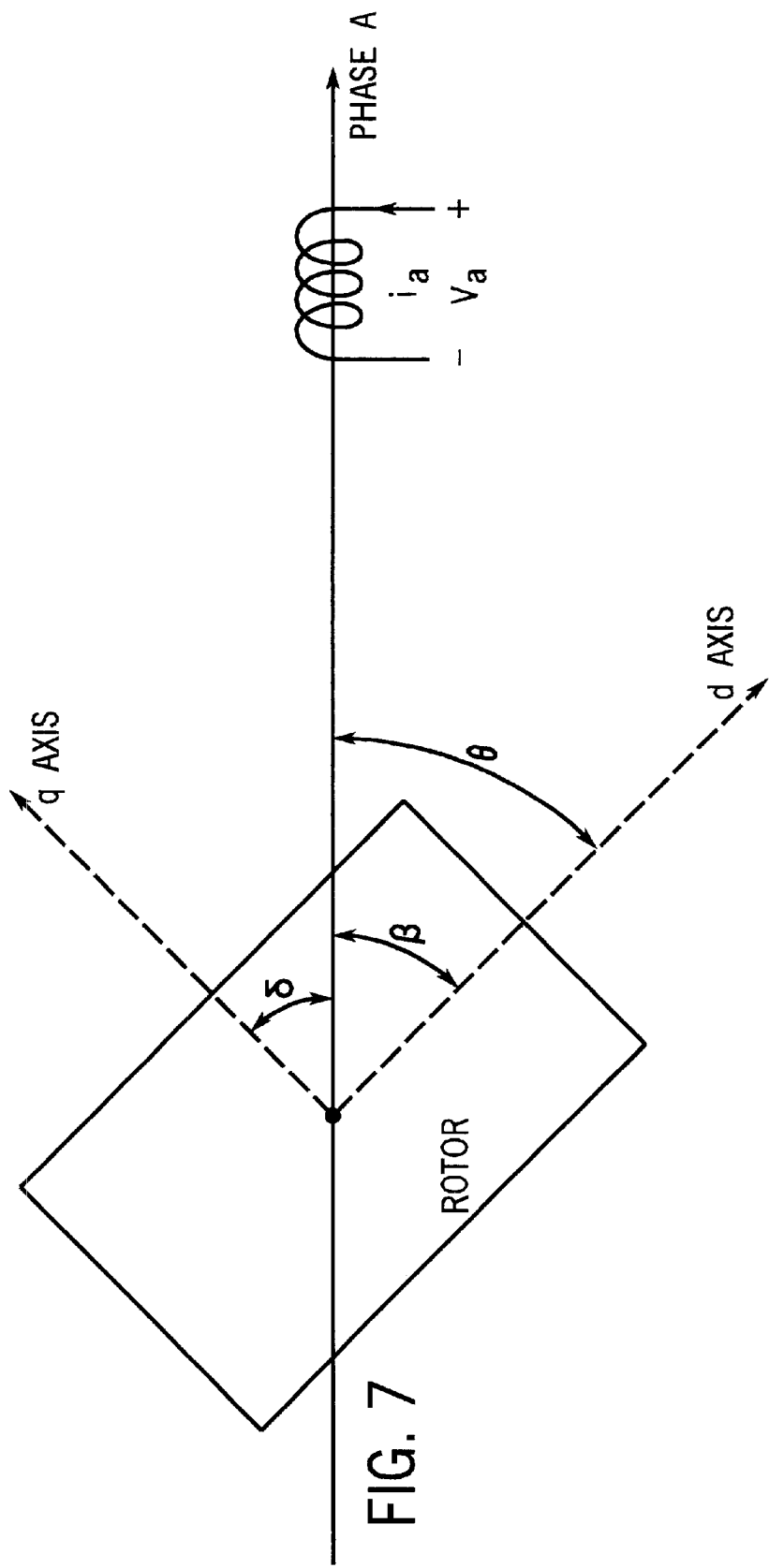
FIGS. 7–9 are phasor diagrams related to the preferred embodiment.

Referring now to FIG. 7, a diagram used in developing a generalized model is shown, and the following definition are used therein:

θ=angle of the d axis relative to phase A

θ=ωt−β

β=position of the rotor at t=0

δ=Torque angle $i_a$=Phase A, (auxiliary output) current $V_a$=Phase A, (auxiliary output) voltage
$i_d$=direct axis current
$i_q$=Quadrature axis current
$i_z$=zero sequence current
$L_{fd}$=Mutual inductance, field to I axis
$L_f$=Field self inductance, including leakage
$R_f$=Field resistance
$V_f$=Field Voltage
$L_d$=d axis self inductance
$V_q$=q axis voltage
$V_d$=d axis voltage.
$V_O$=zero sequence voltage.
$\psi_d$=d axis flux linkages.
$\psi_d$=q axis flux linkage
$L_q$=q axis inductance
$i_f$=Field current
$\omega$=Angular rotation speed
$\delta$=Torque Angle
E=Voltage behind reactance.
The transformation/definitions are:
$i_a = I*\cos\omega t$ (Reference)
$V_a = R_L I*\cos\omega t$, ($R_L$=load resistance)
$i_b = i_c = 0$
$V_a = R_L I*\cos\omega t = V_d*\cos(\omega t-\beta) + V_q \sin(\omega t-\beta) + V_z$
$i_d = 2/3*I*\cos\omega t*\cos(\omega t-\beta)$
$i_d = 2/3*I*1/2*(\cos(2\omega t-\beta) + \cos\beta)$
$i_q = 2/3*I*\cos\omega t*\sin(\omega t-\beta)$
$i_q = 2/3*I*1/2*(\sin(2\omega t-\beta) + \sin(-\beta))$
$i_q = 2/3*I*1/2*(\sin(2\omega t-\beta) - \sin\beta)$
$i_d = I/3*\cos(2\omega t-\beta) + I/3*\cos\beta$
$i_q = I/3*\sin(2\omega t-\beta) - I/3*\sin\beta$
$i_z = I/3*\cos\omega t$
The field voltage equation is:

$$V_f = L_{fd} p i_d + R_f + p L_f)*i_f$$

where p is the derivative operator. For dc p=0, which results in:

$$V_f(dc) = R_f I_f(dc)$$

The ac solution is more complicated:

$$pi_d = -I/3*\sin(2\omega t-\beta)*(2\omega)$$

$$0 = L_{fd}*(-I/3)*(2\omega))*\sin(2\omega t-\beta) + j2\omega i_f L_f$$

($R_f$ compared to $j2\omega L_f$ may be ignored)

$$0 = (-I/3)*L_{fd}*(-j)*(2\omega t)\angle-\beta + j*(2\omega t)i_f L_f$$

$$0 = (I/3)*L_{fd}\angle-B = i_f L_f$$

$$i_f = -I/3*L_{fd}/L_f\angle-\beta = -I/3*L_{fd}/L_f \cos(2\omega t-\beta)$$

$$i_f = I_f - I/3*L_{fd}/L_f*\cos(2\omega t-\beta)$$

(Superposition of the two solutions)
Given $i_d$, $i_f$ and $i_q$, flux linkages may be calculated. $\psi_d$ is the direct axis flux:

$$\psi_d = L_{fd}*[I_f - I/3*L_{fd}/L_f \cos(2\omega t-\beta)] + L_d*[I/3*\cos(2\omega t-\beta) + I/3*\cos\beta]$$

$\psi_q$ is the quadrature axis flux:

$$\psi_q = L_q*[I/3*\sin(2\omega t-\beta) - I/3*\sin\beta]$$

The axis voltage equations are:

$$V_d = p\psi_d + \omega\psi_q$$

$$V_q = -\omega\psi_d + p\psi_q$$

$$V_O = Lo*pi_z$$

Substituting provides:

$$V_d = (2\omega)*L_{fd}^2/L_f*I/3*\sin(2\omega t-\beta) - 2\omega L_d*I/3*\sin(2\omega t-\beta) + \omega L_q*I/3*\sin(2\omega t-\beta) - \omega L_q*I/3*\sin\beta$$

$$V_q = -\omega L_{fd}*[I_f - I/3*L_{fd}/L_f \cos(2\omega t-\beta)] - \omega L_d*[I/3*\cos\beta + I/3*\cos(2\omega t-\beta)] + (2\omega L_q*I/3*\cos(2\omega t-\beta))$$

$$V_O = -\omega L_o*I/3*\sin\omega t$$

$$V_d = [I/3*2\omega*L_{fd}^2/L_f - I/3*2\omega*L_d + I/3*\omega*L_q]*\sin(2\omega t-\beta) - I/3*\omega L_q \sin\beta$$

$$V_d = [I/3*2\omega*(L_{fd}^2/L_f - L_d) + I/3*\omega*L_q]*\sin(2\omega t-\beta) - I/3*\omega*L_q*\sin\beta$$

$$V_d = I/3*X_T*\sin(2\omega t-\beta) - I/3*X_q*\sin\beta,$$

Where $$X_T = (L_{fd}^2/L_f - L_d)*2\omega + \omega L_q \text{ and } X_q = \omega L_q.$$

$$V_q = -\omega L_{fd} I_f - \omega L_d*I/3*\cos\beta + [\omega L_{fd}^2/L_f - \omega L_d + 2\omega L_q]*I/3*\cos(2\omega t-\beta)$$

$$V_q = -E - X_d*I/3*\cos\beta + X_N*I/3*\cos*(2\omega t-\beta)$$

Where $$\omega L_{fd} I_f = E, \omega L_d = X_d, \text{ and } \omega L_{fd}^2/L_f - \omega L_d + 2\omega L_q = X_N$$

In summary:

$$V_d = I/3*X_T*\sin(2\omega t-\beta) - I/3*X_q*\sin\beta$$

$$V_q = -E - X_d*I/3*\cos\beta + X_N*I/3*\cos*(2\omega t-\beta)$$

$$V_O = -X_O*I/3*\sin\omega t$$

Inverse transforms may be used to find a phase voltage:

$$V_a = V_d*\cos(\omega t-\beta) + V_q*\sin(\omega t-\beta) + V_O$$

$$V_a = [I/3*X_T*\sin*(2\omega t-\beta) - I/3*X_q*\sin\beta]*\cos(\omega t-\beta) + [-E - X_d*I/3*\cos\beta + X_N*I/3*\cos(2\omega t-\beta)]*\sin(\omega t-\beta) - X_O*I/3*\sin\omega t$$

$$V_a = I/3*X_T*\sin(2\omega t-\beta)*\cos(\omega t-\beta) - I/3*X_q*\sin\beta*\cos(\omega t-\beta) + -E*\sin(\omega t-\beta) -$$

$$X_d*I/3*\cos\beta*\sin(\omega t-\beta) + X_N*I/3*\cos(2\omega t-\beta)*\sin(\omega t-\beta) - X_O*I/3*\sin\omega t$$

$$V_a = I/3*X_T*1/2*[\sin(3\omega t-2\beta) + \sin\omega t] - I/3*X_q*\sin\beta*\cos(\omega t-\beta) -$$

$$E*\sin(\omega t-\beta) - X_d*I/3*\cos\beta*\sin(\omega t-\beta) + I/3*X_N*1/2*[\sin(3\omega t-2\beta) + -\sin\omega t] - X_O*I/3*\sin\omega t$$

Collecting the fundamental terms yields:

$$V_a = -E*\sin(\omega t-\beta) - X_d*I/3*\cos\beta*\sin(\omega t-\beta) - I/3*X_q*\sin\beta*\cos(\omega t-\beta) + I/3*X_T*1/2*\sin\omega t - I/3*X_N*1/2*\sin\omega t - X_O*I/3*\sin\omega t$$

Phasors, cosine references $\sin\omega t = -j$ are:

$$jE\angle-\beta + jX_d*I/3*\cos\beta\angle-\beta - I/3*X_q*\sin\beta\angle-\beta - jI/3*X_T*1/2\angle0 + jI/3*X_N*1/2\angle0 + jX_O I/3*\angle0°$$

$$j = \angle90$$

$$90-\beta = \delta \text{ (}\delta\text{=torque angle)}$$

$90-\delta=\beta$ $V_a = E\angle\delta + X_d*I/3*\cos\beta\angle\delta - I/3*X_q*\sin\beta\angle-\beta - I/3*X_T*1/2\angle 90 + I/3*X_N*1/2\angle 90 + I/3*X_0*\angle 90°$ $I/3*\cos\beta = I/3*\cos(90-\delta) = I/3*\sin\delta = I_d$ $I/3*\sin\beta = I/3*\sin(90-\delta) = I/3*\cos\delta = I_q$ $V_a = E\angle\delta + X_d I_d\angle\delta - X_q I_q\angle-\beta - I/3*X_T*1/2\angle 90 + I/3*X_N*1/2\angle 90 + I/3*X_0\angle 90°.$ The first three terms of $V_a$ above are the voltage behind reactance, (E, and the $X_d I_d$ are $X_q I_q$ drops are from standard three phase machine theory). The last three terms are due to the asymmetric nature of single phase loading. The sign of the current is changed for a generator—(positive current flows out of the machine).

$V_a = E\angle\delta - X_d I_d\angle\delta + X_q I_q\angle-\beta + I/3*X_T*1/2\angle 90 - I/3*X_N*1/2\angle 90 - I/3*X_0\angle 90$ The last three terms may be treated similar to leakage reactance drops:

$I/3*1/2*\angle 90(X_T-X_N) - I/3*X_0\angle 90$ ($X_T-X_N$ is <0 and $|X_N|>|X_T|$)

Figure 8:
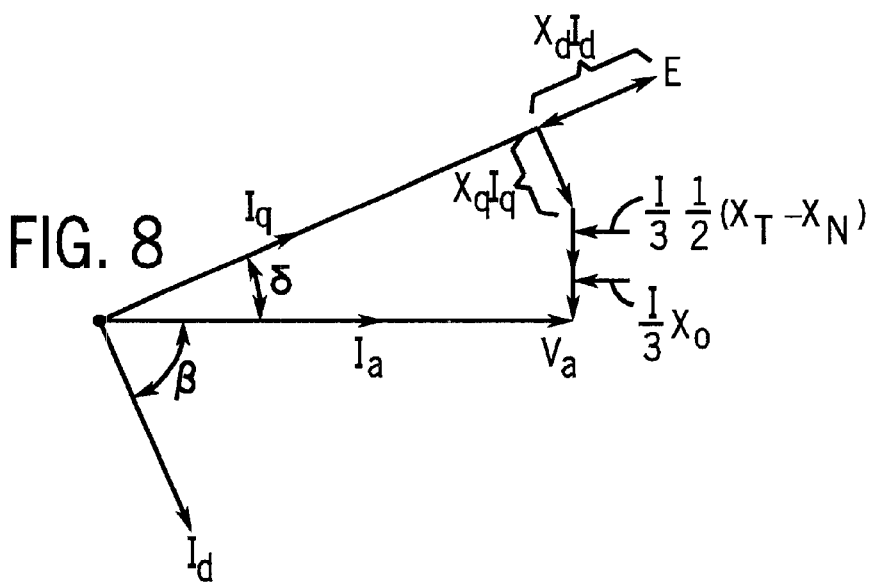

$X_T-X_N$ can be shown to be approximately $-\omega L_q$, as seen on the phasor diagram of FIG. 8.

The third harmonic voltages are calculated as follows:

$I/3*X_T*1/2*\sin(3\omega t-2\beta) + I/3*X_N*1/2*\sin(3\omega t-2\beta)$

The sign is reversed for generator output current:

$-I/3*1/2*(X_T+X_N)*\sin(3\omega t-2\beta)$

Figure 9:
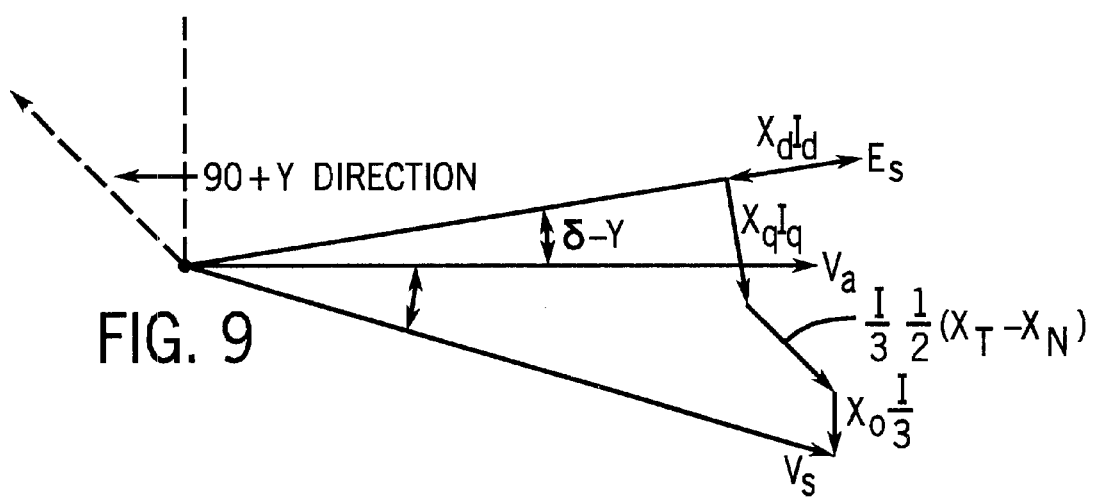

The phasing of the third harmonic relative to the fundamental depends on the torque angle $\delta$. Voltage induced in another stator winding (i.e. exciter winding) at angle $\zeta$ relative to phase A is calculated as follows:

$Vs = V_d*\cos(\omega t-\beta-\zeta) + V_q*\sin(\omega t-\beta-\zeta) + V_0$ $Vs = [I/3*X_T*\sin(2\omega t-\beta) - I/3*X_q*\sin\beta]*\cos(\omega t-\beta-\zeta) + [-E-X_d I/3*\cos\beta + X_N I/3*\cos(2\omega t-\beta)]*\sin(\omega t-\beta-Z) - X_0*I/3*\sin(\omega t)$ $Vs = I/3*X_T*\sin(2\omega t-\beta)*\cos(\omega t-\beta-\zeta) - I/3*X_q*\sin\beta*\cos(\omega t-\beta-\zeta) + -E*\sin(\omega t-\beta-\zeta) - X_d*I/3*\cos\beta*\sin(\omega t-\beta-\zeta) +$ $X_N*I/3*\cos(2\omega t-\beta)*\sin(\omega t-\beta-\zeta) + -X_0*I/3*\sin(\omega t)$ Collecting fundamental terms:

$V_s = -E*\sin(\omega t-\beta-\zeta) - X_d*I/3*\cos\beta*\sin(\omega t-\beta-\zeta) - I/3*X_q*\sin\beta*\cos(\omega t-\beta-\zeta) -$ $X_0*I/3*\sin(\omega t) + I/3*X_T\ \frac{1}{2}*\sin(\omega t+\zeta) - X_N*I/3*1/2*\sin(\omega t+\zeta).$ Phasor and cosine references are:

$V_s = jE_s\angle(-\beta-\zeta) + jX_d*I/3*\cos\beta\angle(-\beta-\zeta) - I/3*X_q*\sin\beta\angle(-\beta-\zeta) + jX_0*I/3*\angle 0 - j*I/3*1/2*X_T\angle\zeta + jX_N*I/3*1/2*\angle\zeta$ $V_s = E\angle(90-\beta-\zeta) + X_d*I/3*\cos\beta\angle(90-\beta-\zeta) - I/3X_q*\sin\beta\angle(-\beta-\zeta) + jX_0*I/3*\angle 0 - j*I/3*1/2*X_T\angle\zeta + jX_N*I/3*1/2*\angle\zeta$ Reversing the sign for generator convention:

$V_s = E_s\angle(\delta-\zeta) - X_d*I_d\angle(\delta-\zeta) + I_q X_q\angle(-\beta-\zeta) - jX_0*I/3*\angle 0 + I/3*1/2*(X_T-X_N)\angle(\zeta+90)$ FIG. 9 is a phasor diagram for fundamental components. The first three terms above are the fundamental voltage from phase A shifted back by angle $\zeta$. The term $I/3*1/2*(X_T-X_N)$ $\angle\zeta$ changes the final phase of Vs. $X_T-X_N$ is negative ($|X_N|>|X_T|$). $X_T-X_N<0$ shifts the phase by 180°. At the correct angle $\zeta$, $I/3*1/2*(X_T-X_N)$ can be in phase with $V_s$ caused by $E_s\angle(\delta-\zeta) - X_d I_d\angle(\delta-\zeta) + X_q I_q\angle-(\beta-\zeta)$ and thus add directly to its magnitude. This condition causes the fundamental voltage to be boosted. The correct angle $\zeta$ is given by:

180+90+Z=-Z

270=-2Z

-90 =-2Z

Z=45°

Thus, according to the calculations, a winding 45° lagging to phase A would have the highest fundamental voltage. This agrees with the placement of 40° lagging (determined empirically) for the auxiliary exciter.

The third harmonic voltages are:

$I/3*1/2*(X_T+X_N)*\sin 3(\omega t-2\beta-\zeta)$

Reverse the sign of the current for generator convention:

$-I/3*1/2*(X_T+X_N)*\sin(3\omega t-2\beta-\zeta)$

It is necessary to know the torque angle ($\delta$) at the load point to determine the exact phasing of the third harmonic relative to the fundamental. This can be calculated from the phaser diagram, with $X_d$ and $X_q$ determined at the load saturation point. For the preferred embodiment:

$\delta=35°$ $\beta=90-35=55$ $2\beta=110°$

The third harmonic is then:

$-I/3*1/2*(X_T+X_N)*\sin(3\omega t-110-\zeta)$ $\zeta=40°$ (from the previous analysis) results in the third harmonic being:

$-I/3*1/2*(X_T+X_N)\sin(3\omega t-110-40)$

The third harmonic reaches its positive peak when the argument of the sin function is -90°. Thus:

$3\omega t-110-40=-90$ $3\omega t=60$ $\omega t=20°$

Given $\omega t=20°$, $\cos(\omega t-40)=\cos(-20)=\cos(20)=0.94\times$ peak value. Hence the peak of the third harmonic coincides closely with the peak of the fundamental voltage as was empirically determined for the exciter winding lagging 40° to the auxiliary output winding placement.

Alternative embodiments include using empirically locating the desired slots, calculating the location of the desired slots, or a combination thereof.

Numerous modifications may be made to the present invention which still fall within the intended scope hereof. Thus, it should be apparent that there has been provided in accordance with the present invention a method and apparatus for welding that fully satisfies the objectives and advantages set forth above. Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

The embodiments of the invention in which an exclusive property or privilege is claimed are defined as follows:

1. An engine-driven welding power supply system comprising:
   a welding output winding;
   a welding exciter winding in magnetic communication with the welding output winding;
   an auxiliary output winding;
   an auxiliary exciter winding in magnetic communication with the auxiliary output winding; and
   a welding power supply in electrical communication with the welding output winding and the auxiliary output winding, wherein the welding power supply has a welding output and an auxiliary output.

2. The engine-driven welding power supply system of claim 1 wherein the welding output winding and the auxiliary output winding are in magnetic communication.

3. The engine-driven welding power supply system of claim 2, wherein the welding output windings and the auxiliary output windings are wound about a common stator.

4. The engine-driven welding power supply system of claim 3, wherein the welding exciter winding and the auxiliary exciter winding are wound about the common stator.

5. The engine-driven welding power supply system of claim 4, wherein the placement of the welding output winding, the auxiliary output winding, the welding exciter winding and the auxiliary exciter winding is such that the welding output and the auxiliary output are optimized.

6. The engine-driven welding power supply system of claim 4, further comprising a field winding disposed to receive field current from the welding exciter winding and from the auxiliary exciter winding.

7. The engine-driven welding power supply system of claim 6, further comprising a rectifier disposed between the welding exciter winding and the field winding, and further including a rectifier disposed between the auxiliary exciter winding and the field winding.

8. The engine-driven welding power supply system of claim 2, further comprising a controller, connected to the welding power supply and the field winding.

9. The engine-driven welding power supply system of claim 1, wherein the welding power supply includes a tapped reactor in electrical communication with the welding output winding and the welding output.

10. The engine-driven welding power supply system of claim 1, wherein the welding output winding, the auxiliary output winding, the welding exciter winding and the auxiliary exciter winding are part of an AC generator.

11. An engine-driven welding power supply system comprising:
   a welding output winding;
   means for providing a welding excitation current, in magnetic communication with the welding output winding;
   an auxiliary output winding;
   means for providing an auxiliary excitation current, in magnetic communication with the auxiliary output winding; and
   welding power supply means for receiving power from the welding output winding and the auxiliary output winding, and for providing a welding output and an auxiliary output.

12. The engine-driven welding power supply system of claim 11 including a generator means for generating power, wherein the generator means includes the welding output winding, the auxiliary output winding, the means for providing welding excitation current and the means for providing auxiliary excitation current.

13. The engine-driven welding power supply system of claim 12, wherein the placement of the welding output winding, the auxiliary output winding, the welding exciter winding and the auxiliary exciter winding is such that the welding output and the auxiliary output are optimized.

14. The engine-driven welding power supply system of claim 11, further comprising field means for providing a magnetic field in the generator, disposed to receive the welding and auxiliary excitation currents.

15. The engine-driven welding power supply system of claim 14, further comprising a rectifier means for rectifying welding excitation current and the auxiliary excitation means.

16. The engine-driven welding power supply system of claim 11, further comprising control means for controlling the welding power supply and the field current.

17. A method of providing welding and auxiliary power comprising:
   turning a primary mover;
   inducing current in a welding output winding;
   inducing current in a welding exciter winding in magnetic communication with the welding output winding;
   inducing current in an auxiliary output winding;
   inducing current in an auxiliary exciter winding in magnetic communication with the auxiliary output winding;
   receiving the output of the welding output winding and providing a welding power output; and
   receiving the output of the auxiliary output winding and providing an auxiliary output.

18. The method of claim 17 wherein inducing a current in the welding output winding also induces a current in the auxiliary output winding.

19. The method of claim 18, wherein the welding output windings and the auxiliary output windings are wound about a common stator associated with a rotor, and wherein turning the primary mover turn the rotor.

20. The method of claim 19, wherein inducing a current in the welding exciter winding induces a current in the auxiliary exciter winding.

21. The method of claim 20, further comprising determining where to place of the welding output winding, the auxiliary output winding, the welding exciter winding and the auxiliary exciter winding by determining what placement optimizes the welding output and the auxiliary output.

22. The method of claim 20, further comprising providing a field current from the welding exciter winding and from the auxiliary exciter winding to a field winding.

23. The method of claim 21, further comprising:
   rectifying an output of the welding exciter winding and providing it to a field winding; and
   rectifying an output of the auxiliary exciter winding and providing it to the field winding.

24. The method of claim 18, further comprising controlling the welding power output by controlling a field winding current.

25. The method of claim 18, further comprising selecting one of a plurality of range of welding power outputs by selecting a tap on a tapped reactor in electrical communication with the welding output winding and the welding output.

26. The method of claim 17, further comprising generating AC power.

27. An engine-driven power supply system comprising:
an output winding;
a first exciter winding in magnetic communication with the output winding;
a second exciter winding in magnetic communication with the output winding; and
a power supply in electrical communication with the output winding.

28. The engine-driven power supply system of claim 27 further comprising a second output winding.

29. An engine-driven welding power supply system comprising:
a generator, including a stator with a plurality of slots;
a welding output winding wound in a first subset of the plurality of slots, wherein a welding output winding magnetic axis is in a first direction;
a welding exciter wound in a second subset of the plurality of slots, wherein a welding exciter winding magnetic axis is in a second direction;
an auxiliary output winding wound in a third subset of the plurality of slots, wherein an auxiliary output winding magnetic axis is in a third direction;
an auxiliary exciter winding wound in a fourth subset of the plurality of slots, wherein an auxiliary exciter winding magnetic axis is in a fourth direction; and
a welding power supply in electrical communication with the welding output winding and the auxiliary output winding, wherein the welding power supply has a welding output and an auxiliary output.

30. The engine-driven welding power supply system of claim 29, wherein the angle between the first direction and the second direction is such that a desired welding output is produced.

31. The engine-driven welding power supply system of claim 30, wherein the angle between the third direction and the fourth direction is such that a desired auxiliary output is produced.

32. The engine-driven welding power supply system of claim 29, wherein the angle between the first direction and the second direction is such that a welding exciter winding voltage increases as the welding output winding is loaded.

33. The engine-driven welding power supply system of claim 32, wherein the angle between the third direction and the fourth direction is such that an auxiliary exciter winding voltage increases as the auxiliary output winding is loaded.

34. The engine-driven welding power supply system of claim 33, wherein the angle between the third direction and the fourth direction is empirically determined.

35. The engine-driven welding power supply system of claim 33, wherein the angle between the third direction and the fourth direction is calculated.

36. A method of designing an engine-driven welding power supply system having a generator with a stator with a plurality of slots, a welding output winding, a welding exciter wound, an auxiliary output winding, and an auxiliary exciter winding, comprising:
winding the welding output windings in a first subset of the plurality of slots such that the welding output winding has a first magnetic axis is in a first direction;
winding the welding exciter windings in a second subset of the plurality of slots such that the welding exciter winding has a second magnetic axis is in a second direction;
winding the auxiliary output windings in a third subset of the plurality of slots such that the auxiliary output winding has a third magnetic axis is in a third direction;
winding the auxiliary exciter windings in a fourth subset of the plurality of slots such that the auxiliary exciter winding has a fourth magnetic axis in a fourth direction; and
attaching a welding power supply in electrical communication with the welding output winding and the auxiliary output winding, wherein the welding power supply has a welding output and an auxiliary output.

37. The method of claim 36, wherein the angle between the third direction and the fourth direction is empirically determined to provide a desired auxiliary output.

38. The method of claim 36, wherein the angle between the third direction and the fourth direction is calculated to increase an auxiliary exciter winding voltage as the auxiliary output winding is loaded.

39. An engine-driven power supply system comprising:
a plurality of output windings in a first plurality of slots;
a plurality of exciter windings in magnetic communication with the plurality of output windings in a second plurality of slots, wherein the location of the first and second plurality of slots is such that a desired output is produced; and
a power supply in electrical communication with the output windings.

40. The engine-drive power supply system of claim 39, wherein there are as many or more windings in the plurality of exciter windings as there are windings in the plurality of output windings.

41. An engine-driven welding power supply comprising:
means for turning a primary mover;
means for inducing current in a welding output winding, mechanically connected to the means for turning;
means for inducing current in a welding exciter winding in magnetic communication with the welding output winding;
means for inducing current in an auxiliary output winding;
means for inducing current in an auxiliary exciter winding in magnetic communication with the auxiliary output winding;
means for receiving the output of the welding output winding and providing a welding power output, electrically connected to the welding output winding; and
means for receiving the output of the auxiliary output winding and providing an auxiliary output.

* * * * *